(12) United States Patent
Chen et al.

(10) Patent No.: US 8,151,183 B2
(45) Date of Patent: Apr. 3, 2012

(54) SYSTEM AND METHOD FOR FACILITATING CONTENT DISPLAY ON PORTABLE DEVICES

(75) Inventors: Yi Chen, Beijing (CN); Yuliang He, Beijing (CN)

(73) Assignee: Lonsou (Beijing) Technologies Co., Ltd., Beijing (CN)

( * ) Notice: Subject to any disclaimer, the term of this patent is extended or adjusted under 35 U.S.C. 154(b) by 776 days.

(21) Appl. No.: 12/296,493

(22) PCT Filed: Mar. 30, 2007

(86) PCT No.: PCT/CN2007/001056
§ 371 (c)(1),
(2), (4) Date: Oct. 8, 2008

(87) PCT Pub. No.: WO2007/115485
PCT Pub. Date: Oct. 18, 2007

(65) Prior Publication Data
US 2009/0125802 A1    May 14, 2009

(30) Foreign Application Priority Data

Apr. 12, 2006 (CN) .......................... 2006 1 0072532
Mar. 30, 2007 (WO) ................ PCT/CN2007/001056

(51) Int. Cl.
*G06F 17/00* (2006.01)

(52) U.S. Cl. .......................... 715/234; 715/239; 715/273
(58) Field of Classification Search .................. 715/239
See application file for complete search history.

(56) References Cited

U.S. PATENT DOCUMENTS

| | | | |
|---|---|---|---|
| 6,725,426 B1 * | 4/2004 | Pavlov | 715/205 |
| 7,120,702 B2 * | 10/2006 | Huang et al. | 709/246 |
| 2002/0099598 A1 * | 7/2002 | Eicher et al. | 705/11 |
| 2004/0128342 A1 * | 7/2004 | Maes et al. | 709/200 |
| 2004/0204130 A1 | 10/2004 | Khazaka et al. | |
| 2005/0005259 A1 * | 1/2005 | Avery et al. | 717/103 |
| 2005/0050000 A1 * | 3/2005 | Kwok et al. | 707/1 |
| 2006/0230100 A1 | 10/2006 | Shin et al. | |

* cited by examiner

*Primary Examiner* — Doug Hutton, Jr.
*Assistant Examiner* — Ariel Mercado
(74) *Attorney, Agent, or Firm* — Shun Yao; Park, Vaughan, Fleming & Dowler LLP

(57) ABSTRACT

One embodiment of the present invention provides a system for facilitating a universal file conversion hub to convert structured or unstructured data to structured data suitable for display on mobile or hand-held devices. During operation, the system receives a file which contains structured or unstructured data, or a mixture of both. The system determines a type of the received file and analyzes content, formatting style, or both, of the received file based on the file type. The system further generates a processable extensible markup language file, which substantially retains a layout of the received file, thereby facilitating display of the file on mobile or hand-held devices.

21 Claims, 4 Drawing Sheets

SYSTEM AND METHOD FOR FACILITATING CONTENT DISPLAY ON PORTABLE DEVICES

BACKGROUND

1. Field of the Invention

The present invention relates to data management. More specifically, the present invention relates to an extensible markup language hub that facilitates conversion of unstructured data to structured data for displaying on a variety of portable devices.

2. Related Art

The proliferation of wireless portable devices has significantly expanded the accessibility of the Internet. Today, a user can check emails, surf the Web, or get real-time stock quotes through a mobile phone. This Internet behavioral change requires content providers to format and present data in a specific way that is suitable for displaying on a portable device.

For example, different Internet-enabled smart phones or personal data assistants (PDA's) have different screen sizes. Conventional HTML pages can have unexpected, often garbled, display results on different screens. This problem is further exacerbated when the content contains formatted documents such as ADOBE PDF® files or MICROSOFT WORD® files.

To overcome these display problems, content providers often provide two versions of a web site, one for display on regular desktop or laptop computers and one for portable devices. The portable-device version, however, often contains a stripped-down version containing only essential text to avoid unpredictable display results. This solution is not only unsatisfactory due to the omission of the original rich content, but also costly because authoring the second stripped-down version involves time-consuming human operation. It is therefore desirable to have a system and method for displaying content on portable devices without the aforementioned problems.

SUMMARY

One embodiment of the present invention provides a system for facilitating a universal file conversion hub to convert structured or unstructured data to structured data suitable for display on mobile or hand-held devices. During operation, the system receives a file which contains structured or unstructured data, or a mixture of both. The system determines a type of the received file and analyzes content, formatting style, or both, of the received file based on the file type. The system further generates a processable extensible markup language file, which substantially retains a layout of the received file, thereby facilitating display of the file on mobile or hand-held devices.

In a variation of this embodiment, the received file comprises one or more of the following files: a text file; a hypertext file; a Portable Document Format (PDF) file; a Microsoft Word® file; a Rich Text Format (RTF) file; a Microsoft Excel® file; a Microsoft PowerPoint® file; an Adobe FrameMaker® file; a LaTex file; and a program source code file.

In a variation of this embodiment, the received file contains structured data; and generating the processable extensible markup language file involves applying an extensible stylesheet language transformation tool.

In a further variation, applying the extensible stylesheet language transformation tool involves transforming the processable extensible markup language file to one or more of the following files: a DocBook XML file; a LegatXML file; a VoiceXML file; a MathXML file, a WML file, and an XHTML MP file.

In a variation of this embodiment, the system defines the following elements in the processable extensible markup language: XMLSTREAM, HEAD, DMETATAGS, DMETA, EMETATAGS, EMETA, DSTYLES, DSTYLE, DSTRUCTURE, BODY, SECTION, PAGE, PARAGRAPH, SPECIALTEXT, TEXT, IMAGE, LINK, FOOTNOTE, ENDNOTE, HEADER, FOOTER, ANCHOR, TAB, HR, MARKER, TABLE, TGROUP, TBODY, THEAD, TFOOT, ROW, CELL, COLUMN, COLUMN-DEF, LIST, LI, LABEL, BLOCKQUOTE, PRE, BREAK, FRAME, SVG, FIELD, and INDEXITEM; wherein each element has one or more of the following attributes: style, css-style, number, font, font-size, font-fixed, origfont, emphasis, emphasis-bold, emphasis-italic, emphasis-underline, emphasis-superscript, emphasis-subscript, x, y, height, width, top, left, align, valign, leftindent, rightindent, space before, spaceafter, textindent, border-left, border-right, border-top, border-bottom, top-padding, left-padding, right-padding, bottom-padding, rowspan, colspan, width-type, and height-type.

In a further variation, analyzing content of the received file comprises: selectively converting images within the received file to a pre-determined format and marking a converted image with an IMAGE element; marking a bookmark, break character, field, header, footer, and footnote in the received file with an ANCHOR, BREAK, FIELD, HEADER, FOOTER, SECTION, and FOOTNOTE element, respectively, wherein the break character can be of a page, column, or section type; analyzing a text formatting style of the received file and assigning corresponding values to the attributes of a PARAGRAPH element; analyzing a special object embedded in the received file and marking the special object with a SPECIALTEXT element; marking a link within the received file with a LINK element; marking a list within the received file with a LIST element; marking a table within the received file with TABLE, TGROUP, TBODY, THEAD and COLUMN elements; and marking a layered structure within the received file with one or more FRAME elements.

In a variation of this embodiment, the received file includes a piece of program source code. Analyzing content of the received file comprises analyzing a class name, a class path, or a class parameter of the program source code.

In a variation, the system dynamically loads a file analyzer based on the file type.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now know or later developed.

Overview

Unpredictable display of content is a major problem experienced by today's portable device users. Such portable devices include, but are not limited to, mobile telephones, PDAs, and any wireless or wired computing devices with display screens different from those for desktop or laptop computers. Garbled display on non-standard-sized screens, however, is only the pronouncement of a more profound problem: most of the data on the Internet is unstructured. That is, majority of the information is not organized to allow identification and separation of the context of the information from its content.

If a piece of content is structured, a user-end device can more easily place different portions of the content on the display screen according to the context. For example, a smart phone can reformat the text of a news story with proper placement of the headline and associated graphics if the news story is contained in a structured file.

To provide a standard for describing structured data, the World Wide Web Consortium (W3C) has developed the Extensible Markup Language (XML) standards. XML facilitates standardized description of structured data and allows software developers and content authors to more easily organize data on the Internet. The XML standards are expected not only to meet the ever-increasing demand for data on the Internet, but also to ensure superior data reliability and interoperability. The capability of XML to define file types facilitates more convenient expression and more structured organization of information. Users can now use a uniform format to organize and transfer data, which can significantly lower the cost of data exchange and management.

Embodiments of the present invention provide a system that facilitates universal content conversion based on a unique, innovative set of XML definitions, namely processable XML (pXML). By using pXML, a universal content conversion hub can accept any type of text content, structured or unstructured, and convert the content into structured data which can be readily displayed by different portable devices. This pXML-based content conversion hub allows data of different types and formats to be organized and seamlessly exchanged, and improve the reusability of text contents.

Figure 1:
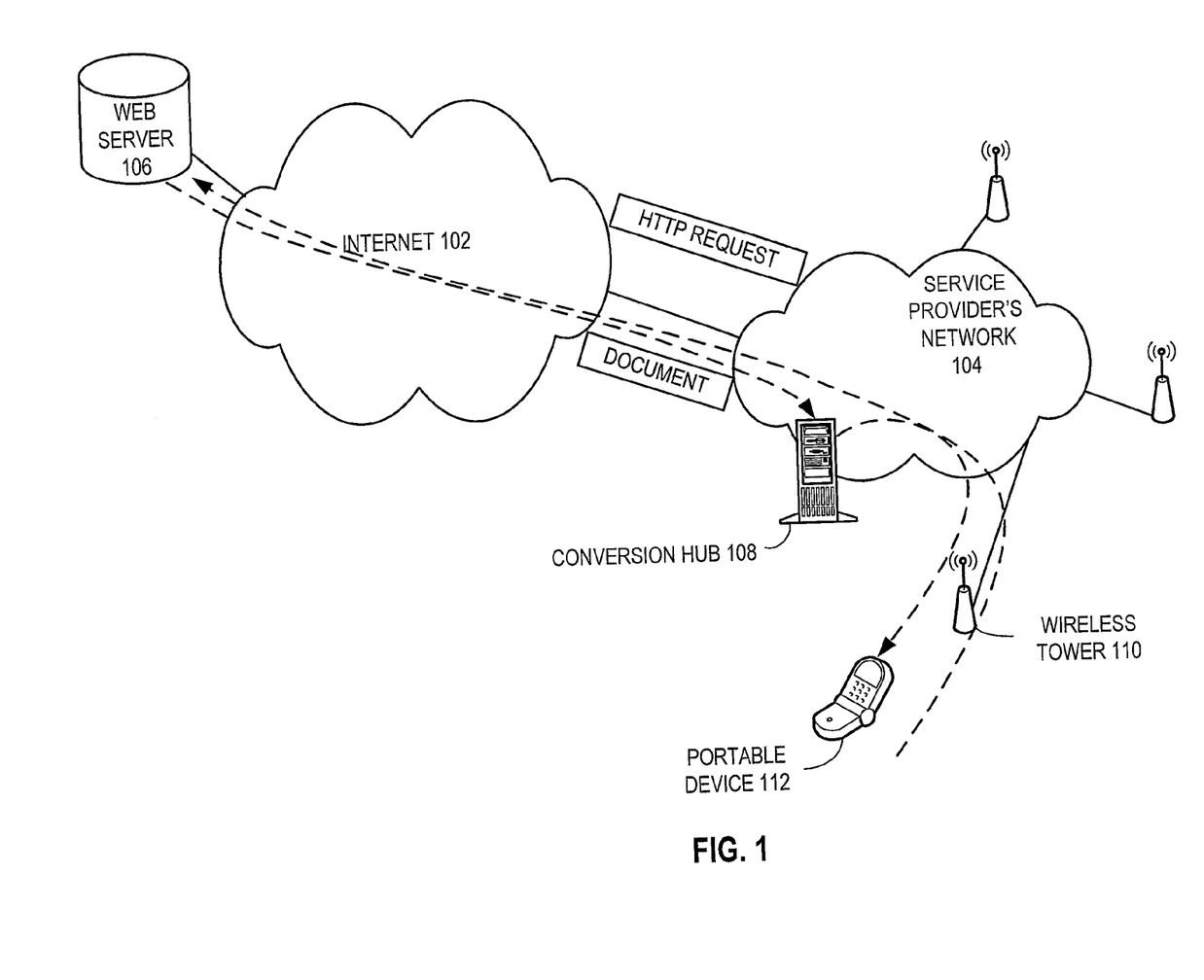
FIG. 1 illustrates the operation of a universal content conversion hub in accordance with one embodiment of the present invention.

FIG. 1 illustrates the operation of a universal content conversion hub in accordance with one embodiment of the present invention. A user uses an Internet-enabled portable device 112, such as a smart phone, to issue an HTTP request for a web page. A wireless tower 110 receives the wireless signal from portable device 112 and relays this request through the service provider's network 104. Network 104 can be either land-line based or wireless, and can be either public or private. The HTTP request is then forwarded to the Internet 102.

After receiving the HTTP request, a Web server 106 responds with the requested document, which in this case is a Web page. Note that a document generally can include any type of text or non-text content. For example, the returned document can contain a MICROSOFT WORD file, a PDF file, an EXCEL file, a LATEX file, or an HTML file.

In conventional networks, the returned document is directly delivered to portable device 112. Consequently, the document can suffer garbled presentation on portable device 112 which may have screen size unsuitable for displaying the document.

One embodiment of the present invention provides a content conversion hub that converts different types of text content into structured content which can be properly displayed on a portable device. In one example, service provider's network 104 directs the returned document to a conversion hub 108. Conversion hub 108 analyses the text content within the received document and converts the text content into a structured-data format. In one embodiment, conversion hub 108 generates a pXML file, as is described in more details in subsequent sections. The pXML file contains structured data based on the document returned by server 106. In addition, conversion hub 108 converts the pXML file into a format that can be displayed by portable device 112, according to the terminal equipment type of portable device 112. For example, conversion hub 108 can convert the mXML file to a Wireless Markup Language (WML) file, an XHTML-Mobile Profile (XHTML-MP) file, or a Compact HTML (cHTML) file, and sends the file to portable device 112. This file can contain both text and graphic information. Portable device 112 can then properly formulate the text and/or graphic content within the received file for display on its screen.

Universal Conversion Hub

Figure 2:
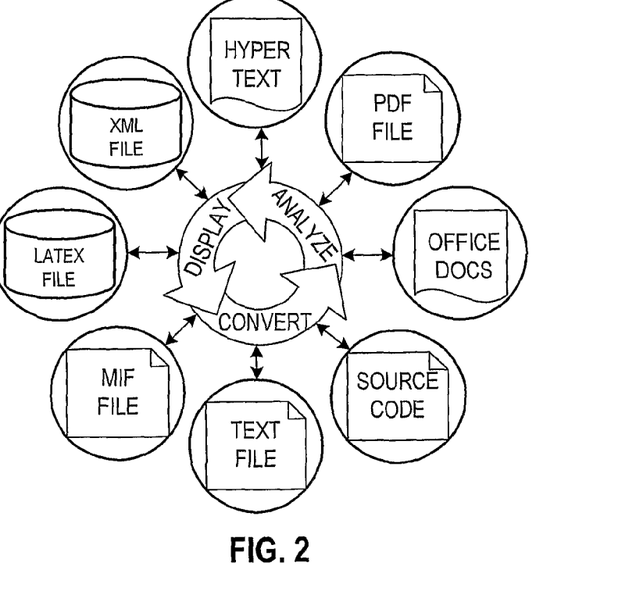
FIG. 2 illustrates the essential functions of the universal content conversion hub in accordance with one embodiment of the present invention.

FIG. 2 illustrates the essential functions of the universal content conversion hub in accordance with one embodiment of the present invention. In general, the universal content conversion hub can accommodate any text-content file as its input. For example, the input can be a hyper-text file, a PDF file, a MICROSOFT OFFICE document, a piece of source code, a simple text file, an ADOBE Maker Interchange Format (MIF) file, a LATEX file, or an XML file. The universal conversion hub analyzes the input file and converts the file to a structured pXML file which specifies the content as well as the formatting style of the text content. This pXML file allows the content to be formatted and displayed according to the specific screen size of a portable device. Note that the universal content conversion hub can use any existing file analyzing technologies. Such file analyzer can be based on open-standard file formats, or proprietary file formats.

The universal conversion hub can further convert the pXML file to other files. For example, the universal conversion hub can convert a PDF file to a pXML file, and then to a hyper-text file. In another example, a MICROSOFT OFFICE document file can be converted to a pXML file and then to an ADOBE MIF file.

When the input file contains structured data, the universal conversion hub can apply an extensible stylesheet language transformation tool. The universal conversion hub can further transform a generated pXML file into one or more of the following files: a DocBook XML file, a LegalXML file, a VoiceXML file, a MathXML file, a Wireless Markup Language (WML) file, and an XHTML-Mobile Profile (XHTML-MP) file. Other structured or non-structured file formats are also possible.

Figure 3:
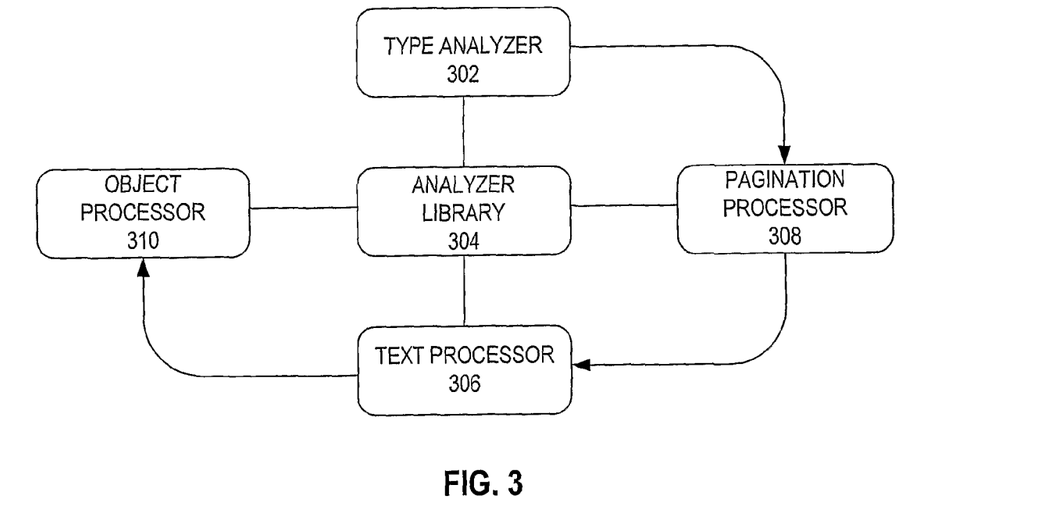
FIG. 3 illustrates an exemplary architecture of the universal content conversion hub in accordance with one embodiment of the present invention.

FIG. 3 illustrates an exemplary architecture of the universal content conversion hub in accordance with one embodiment of the present invention. The main building blocks of a universal conversion hub include a type analyzer 302, a pagination processor 308, a text processor 306, an analyzer/parameter library 304, and an object processor 310. These building blocks may require additional modules, such as a parameter library and a pXML element and attribute library. Type analyzer 302 determines the type of the input file. The input file type can be any unstructured types, such as text, hyper-text, PDF, WORD, Rich Text Format (RTF), EXCEL, POWERPOINT, program source code, MIF, and LATEX; or any structured types, such as Wireless Markup Language (WML). The description below refers to pXML elements or attributes, which are described in further detail in the subsequent section.

Pagination processor 308 analyzes files which contain layers, columns, or frames. For example, pagination processor 308 can recognize and extract the frame and layering information in an HTML page, or the column and layering information in a PDF file. In one embodiment, pagination processor 308 processes the data contained in each HTML frame individually. In a further embodiment, pagination processor 308 treats a layer in a PDF file as a layer element in a page. Furthermore, columns in a file are treated as paragraph elements in a page based on a left-to-right order.

Text processor 306 processes the text content in the file, including font type, style, layout, and font size. This information is reflected as attributes of a paragraph. Text processor 306 also handles links and tags embedded in the file. For example, if a link is present, text processor 306 generates a corresponding LINK element in the pXML file.

Object processor 310 handles special content in the file, such as figures, tables, and mathematical equations. Based on such special content, object processor 310 can generate the corresponding elements such as IMGAGE, TABLE, SPECIALTEXT in the pXML file.

Analyzer/parameter library 304 stores a number of file analyzers which can handle different file types. In one embodiment, every file analyzer has an open interface, allowing the universal conversion hub to dynamically load and change file analyzers. Analyzer/parameter library 304 also stores a number of environmental variables such as output content format and type of file analyzer used. During operation, if the environmental parameters are read into the EMATATAGS element in the generated pXML file, analyzer/parameter library 304 also stores a mapping table between the pXML elements/attributes and the formatting tags of the file.

pXML Definition

One embodiment of the present invention defines the pXML file format as follows. First, pXML format contains a number of elements: XMLSTREAM, HEAD, DMETATAGS, DMETA, EMETATAGS, EMETA, DSTYLES, DSTYLE, DSTRUCTURE, BODY, SECTION, PAGE, PARAGRAPH, SPECIALTEXT, TEXT, IMAGE, LINK, FOOTNOTE, ENDNOTE, HEADER, FOOTER, ANCHOR, TAB, HR, MARKER, TABLE, TGROUP, TBODY, THEAD, TFOOT, ROW, CELL, COLUMN, COLUMN-DEF, LIST, LI, LABEL, BLOCKQUOTE, PRE, BREAK, FRAME, SVG, FIELD, and INDEXITEM.

These elements are also defined to have the following attributes: style, css-style, number, font, font-size, font-fixed, origfont, emphasis, emphasis-bold, emphasis-italic, emphasis-underline, emphasis-superscript, emphasis-subscript, x, y, height, width, top, left, align, valign, leftindent, rightindent, spacebefore, spaceafter, textindent, border-left, border-right, border-top, border-bottom, top-padding, left-padding, right-padding, bottom-padding, rowspan, colspan, width-type, and height-type.

Specifically, the elements are given the following definition:

(1) Element XMLSTREAM is the root element, can have elements HEAD and BODY as child elements, and does not have defined attributes;

(2) Element HEAD describes the header information for the file, can have element XMLSTREAM as a parent element, can have elements DMETATAGS, EMETATAGS, and DSTRUCTURE as child elements, and does not have defined attributes;

(3) Element DMETATAGS describes meta tags and attributes of the file, can have element HEAD as a parent element, and element META as a child element;

(4) Element META describes an individual attribute of the file, has element DMETATAGS as a parent element, does not have any child elements, and has a META name and value;

(5) Element EMETATAGS describes a set of environment attributes during the generation of the processable extensible markup language file, can have element HEAD as a parent element, and can have element EMETA as a child element;

(6) Element EMETA describes an individual environment parameter during the generation of the processable extensible markup language file, can have element EMETATAGS as a parent element, does not have any child elements, and has an EMETA name and value;

(7) Element DSTYLES describes style attributes of the file, can have element HEAD as a parent element, and can have element STYLE as a child element;

(8) Element STYLE describes the layout format of the file, can have element DSTYLES as a parent element, and can have the following attributes:
  name, font, font-size, font-fixed, align, valigh, leftindent, rightindent, linespacing, spacebefore, spaceafter, emphasis, emphasis-bold, emphasis-italic, emphasis-underline, emphasis-superscript, and emphasis-subscript;

(9) Element DESTRUCTURE describes bookmarks in a PDF file, and can have element HEAD as a parent element and element OUTLINE as a child element;

(10) Element BODY describes the main body of the file, can have the XMLSTREAM element as a parent element and any block element as child element, including elements SECTION, PAGE, and BLOCK;

(11) Element SECTION describes sections in a Microsoft WORD® file, can have BODY as a parent element, can have any block element as a child element, and has the following attributes:
  number, orientation, height, width, margin-left, margin-top, margin-right, margin-bottom, section-type, and columns;

(12) Element PAGE describes a signal page in a multi-page file, can have element BODY as a parent element, and any block elements, including elements PARAGRAPH, IMAGE, TABLE, LIST, BLOCKQUOTE, PRE, ANCHOR, BREAK, and FRAME as child elements; wherein element PAGE further has the following attributes:
number, height, width, margin-left, margin-top, margin-right, and margin-bottom;

(13) Element PARAGRAPH describes text in the file, can have elements BODY, CELL, LI, BLOCKQUOTE, SECTION, and PAGE as parent elements, can have #PCDATA, SPECIALTEXT, LINK, ANCHOR, IMAGE, TEXT, and FLELD as child elements; and have the following attributes:
front-related, paragraph-related, emphasis-related, number, style, x, y, height, and width;

(14) Element SPECIALTEXT describes text within element PARAGRAPH which has a different formatting style from a regular formatting style of element PARAGRAPH, can have element PARAGRAPH as a parent element, can have elements #PCDATA, SPECIALTEXT, LINK, ANCHOR, IMAGE, TEXT, and FIELD as child elements, and have the following attributes:
font-related, emphasis-related, number, style, x, y, height, and width;

(15) Element TEXT describes text within element PARAGRAPH which has the same formatting style as element PARAGRAPH, can have element PARAGRAPH as a parent element, can have #PCDATA, SPECIALTEXT, LINK, ANCHOR, IMAGE, TEXT, and FIELD as child elements, and have the following attributes:
font-related, emphasis-related, number, style, x, y, height, and width;

(16) Element IMAGE describes images in the file, can have elements BODY, PAGE, CELL, LI, BLOCKQUOTE, PRE, and PARAGRAPH as parent elements, and have the following attributes:
herf; which is an image file name which indicates a relative path name for the image,
format, which indicates a format of the image,
width and height, which indicate the width and height of the image, respectively,
x and y, which indicate a position of the image with regard to a page,
number, which indicates a location of the image relative to other images or paragraphs, and
alt, which indicates a text describing the image in hypertext;

(17) Element LINK describes links, contains text description, can have elements PARAGRAPH and SPECIALTEXT as parent elements, can have #PCDATA, and SPECIALTEXT as child elements, and have attributes href and alt;

(18) Elements FOOTNOTE and ENDNOTE describe footnotes and endnotes of the file, can be placed within element PARAGRAPH or at the end of the file, can have elements BODY and PARAGRAPH as parent elements and block elements as child elements, and have the following attributes:
ref; reftype, and label.

(19) Elements HEADER and FOOTER describe headers and footers of the file, can be placed within element PARAGRAPH or at the end of the file, can have element BODY as a parent element and block elements as child elements, and have the following attributes:
number, which indicates the number of the section where the HEADER or FOOTER element is located,
headerType, which indicates whether the header is on a first page, a last page, an odd page, or an even page, and
footerType, which indicates whether the footer is on a first page, a last page, an odd page, or an even page;

(20) Element ANCHOR describes a Uniform Resource Identifier (URI), can be placed inside or outside a PARAGRAPH element, can have elements BODY, PAGE, CELL, LI, BLOCKQUOTE, PRE, PARAGRAPH, and SPECIALTEXT as parent elements, and have attributes name and number, wherein attribute number indicates the ANCHOR element's relative location in the file;

(21) Element TAB describes a tab character in the file;

(22) Element HR describes a hypertext file;

(23) Element MARKER describes a termination character in the file, can have element PARAGRAPH as a parent element, and has attributes id and number which indicates a location of the element MARKER;

(24) Element TABLE describes a table within the file, can have elements BODY, PAGE, SECTIONCELL, LI, BLOCKQUOTE, and PRE, can have elements TGROUP, COLUMN, and ROW as child elements, and has attribute number which indicates a location for the element MARKER;

(25) Elements TGROUP, TBODY, THEAD, and TFOOT describe a table within the file and have attribute cols which indicates the number of rows in the TGROUP element;

(26) Element ROW is a child element of the TABLE element, describes a row within a table, can have element CELL as a child element, and can have the following attributes:
rowtype, wherein a value of "header" indicates the row to be a header row, and a value of "data" indicates the row to be a regular row;
style, which indicates the formatting style of the row; and
number, which indicates a location of the row relative to the file;

(27) Element CELL is a child element of the ROW element, describes a cell within a table, can have elements PARAGRAPH, LIST, TABLE, BLOCKQUOTE, PRE, IMAGE, and ANCHOR as child element, and have the following attributes:
celltype, which indicates the type of the cell,
wherein a value of "header" for celltype indicates that the cell is a header cell, and
wherein a value of "data" for celltype indicates that the cell is a regular cell,
style, which describes the formatting style of the cell, and
number, which indicates a location of the cell relative to the file;

(28) Element COLUMN is a child element of the TABLE element, describes a single column in a table, can have elements TABLE and TGRPOUP as parent elements, does not have any child elements, and has the following attributes:
column-id, which indicates an index number of the column in the table, and
width, which indicates a width of the column;

(29) Element COLUMN-DEF defines a column in a table, can have element TABLE as a parent element and element COLUMN as a child element, and has attribute cols, which indicates a number of columns;

(30) Element LIST describes a list in the file, can have element LI as a child element, and has the following attributes:

type, which indicates the type of the list, and which can be of value "OL," "UL," or "DL," wherein "OL" denotes an ordered list, "UL" denotes an unordered, floating list, and "DL" denotes an unordered, non-floating list, number, which indicates a location for the list in the file, and style, which indicates a formatting style of the list;

(31) Element LI is a child element for the LIST element, describes a list item, can have elements PARAGRAPH, LIST, TABLE, LI, BLOCKQUOTE, PRE, IMAGE, and ANCHOR as child elements, and has the following attributes:

level, which indicates a nesting level for the list, number, which indicates a location of for the list item in the file, style, which indicates a formatting style of the list item, and type, which can have a null value or a value of "DT" or "DL" when the list to which the list item belongs is of type "DL," indicating the list item to be a header item or a data item, respectively;

(32) Element LABEL is a child item of the LI item, describes a Microsoft WORD® document, can have elements PARAGRAPH and LI as parent elements, and has element #PCDATA as a child element;

(33) Element BLOCKQUOTE describes a nested text, can have a block container as a parent element and a block-level element as a child element, and can have an attribute number which describes a location for the nested text in the file;

(34) Element PRE presents encapsulated text with original layout and formatting, can have a block container as a parent element and a block-level element as a child element, and can have an attribute number which describes a location for the encapsulated text in the file;

(35) Element BREAK describes a break character in the file, can have any element as a parent element, does not have a child element, and has the following attributes:

type, which indicates the breach character's type, such as a page break, a column break, or a line break, and number, which indicates a location of the break character in the file;

(36) Element FRAME describes a text frame in the file, has elements BODY, SECTION, and PAGE as parent elements, can have any block element as a child element, and has attributes x, y, top, left, height, width, and number;

(37) Element SVG describes an external Scalable Vector Graphics (SVG) file included in a PDF file, has element PAGE as a parent element, does not have any child element, and has attribute src, which indicates a relative or absolute file name for the SVG file;

(38) Element FIELD describes a field embedded in the file which typically appears in a Microsoft WORD® file, can have elements PARAGRAPH, TEXT, SPECIAL-TEXT as parent elements, and element #PCDATA as a child element, and has attribute code which describes a field code; and (39) Element INDEXITEM describes an index item within an Adobe FRAMEMAKER® Maker Interchange Format (MIF) file, can have elements PARAGRAPH, TEXT, SPECIALTEXT as parent elements, can have element INLINE as a child element, and has the following attributes:

primary, which indicates a primary index item, secondary, which indicates a secondary index item, and tertiary, which indicates a tertiary index item, The attributes are defined as follows:

(1) Attribute style indicates a formatting style for the PARAGRAPH or SPECIALTEXT element;

(2) Attribute css-style describes a hyper-text file, wherein if the hyper-text file includes a "paragraph" element with a "style" attribute which further includes a Cascading Style Sheets (CSS) attribute, the css-style attribute includes the CSS attribute of the hyper text file verbatimly;

(3) Attribute number indicates a location of an element in the file, and comprises a value not less than 1;

(4) Attributes font, font-size, font-fixed, and origfont describe attributes related to fonts, wherein the font attribute specifies the font name, the font-size attribute specifies an absolute font size in a Microsoft WORD® file or a PDF file or a relative font size in a hyper-text file, the font-fixed attribute is a Boolean variable wherein a "true" value indicates a font with a fixed width, and wherein the origfont attribute indicates an original font in the file;

(5) Attributes emphasis, emphasis-bold, emphasis-italic, emphasis-underline, emphasis-superscript, emphasis-subscript, which comprise Boolean variables, indicate a formatting style of a font, wherein emphasis-bold indicates a font to be bold, emphasis-italic indicates a font to be italic, emphasis-underline indicates a font to be underlined, emphasis-superscript indicates a font to be superscript, and emphasis-subscript indicates a font to be subscript;

(6) Attributes x, y, height, width, top, and left describe special formatting styles of the file, wherein x and y indicate a coordinate within a page and can be of absolute or relative values, height and width indicate the height and width of a text or graphics object, and top and left indicate the distance a text or graphics object is from the edges of a page;

(7) Attributes align, valign, leftindent, rightindent, spacebefore, spaceafter and textindent describe formatting styles of a paragraph, wherein align indicates horizontal alignment and has value "left," "center," "right", "justify," or "blank," which indicate left aligned, center aligned, right aligned, justified, or blank, respectively, valign indicates vertical alignment and has value "top," "middle," "bottom," or "blank," which indicate top aligned, middle aligned, bottom aligned, or blank, respectively, leftident indicates the amount of left indentation of the paragraph, rightindent indicates the amount of right indentation of the paragraph, linespacing indicates the amount of space between two lines and has a default value of "1" which denotes single spacing, spacebefore indicates the amount of space before a paragraph begins, spaceafter indicates the amount of space after a paragraph ends, and textindent indicates the amount of indentation of a first line of the paragraph;

(8) Attributes border-left, border-right, border-top, border-bottom comprise either numerical or Boolean values, and describe respectively whether a text block or a table cell has left, right, top, or bottom border, wherein each attribute can further specify the color of the corresponding border;

(9) Attributes top-padding, left-padding, right-padding, bottom-padding comprise integer values and indicate a color which is filled between a top, left, right, or bottom border and the content of a cell, respectively;

(10) Attributes rowspan and colspan comprise numerical values and indicate the row span and column span of a table, respectively;

(11) Attributes width-type and height-type describe tables within a Microsoft WORD® file, and can have the following values:

"auto," which indicates that the width or height of a text object is automatically adjusted, "percent," which indicates that the values of width or height of a text object is a percentage value, "points," which indicates that the values of width or height of a text object is a value measured in points, and "fixed," which indicates that the width or height of a text object is fixed.

Note that the definition described above is only one embodiment of the present invention. Other variations of pXML definition are also possible.

System Operation

Figure 4:
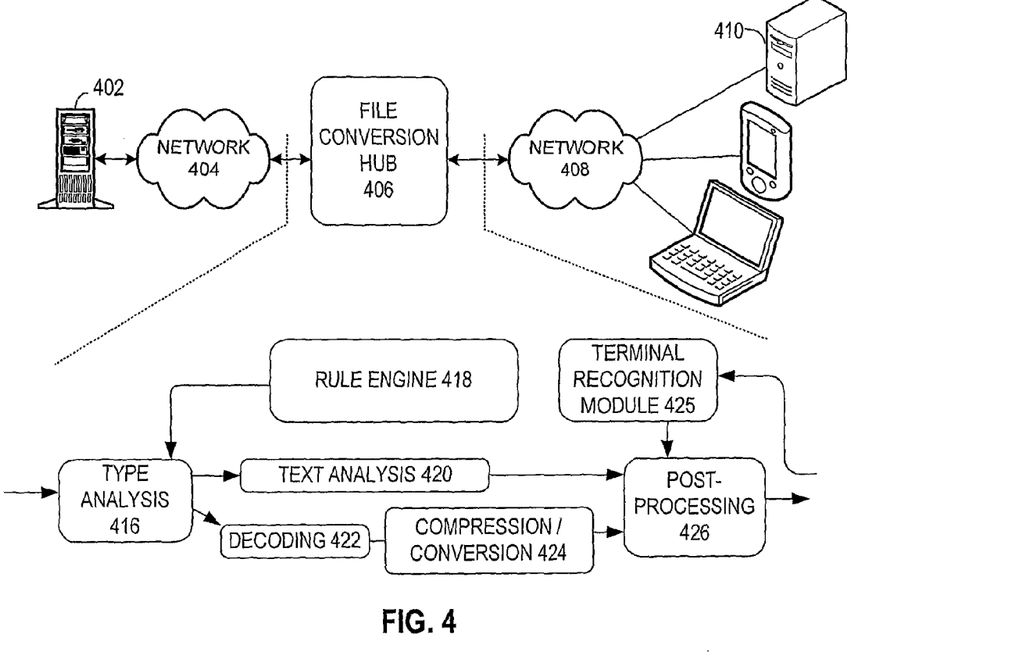
FIG. 4 presents an exemplary block diagram illustrating the operation of the universal content conversion hub in accordance with one embodiment of the present invention.

FIG. 4 presents an exemplary block diagram illustrating the operation of the universal content conversion hub in accordance with one embodiment of the present invention. A server 402 sends a file which is requested by a client 410 over networks 404 and 408. Note that, without losing generality, client 410 can be any portable or non-portable device. In this example, a universal file conversion hub 406 resides between network 404 and network 408. In other embodiments, file conversion hub 406 can also reside within a network such as the Internet.

Within file conversion hub 406, the file sent by server 402 is first received by a file-type analysis module 416. A rule engine 418 stores mapping information between file types and which analyzer engine is to be used. Based on information provided by rule engine 418, type analysis module 416 selects the proper file analyzer. Subsequently, a text analysis module 420 loads the selected file analyzer, analyzes the file, and generates the pXML file. A decoding module 422 also decodes special objects, such as images, embedded in the file. Furthermore, a compression/conversion module 424 compresses or converts the decoded objects into a pre-determined file format. For example, a GIF or bitmap image contained in the file is first decoded by decoding module 422, and then compressed and converted to, for example, a JPEG file by compression/conversion 424. Next, a post-processing unit 426 finalizes the pXML file by inserting the proper tags corresponding to the converted objects into the pXML file.

Note that, in general, client 410, which may be a portable device, is not required to be able to interpret a pXML file. In fact, different types of portable devices may be configured to interpret different file formats, which can be open or proprietary. In one embodiment, the universal content conversion hub also includes a terminal recognition module 425. Terminal recognition module 425 can collect information about the client's terminal and forward this information to post-processing unit 426. Post-processing unit 426 can then generate a file based on the pXML file which can be readily displayed by the client. The generated file is then sent to network 408. In response, a portable device that has requested the file can receive a properly formatted file, which not only contains the original content, but also can be displayed on non-standard-size screens. For example, a WML-enabled cell phone can visit and display any regular web pages through this content conversion system.

Figure 5:
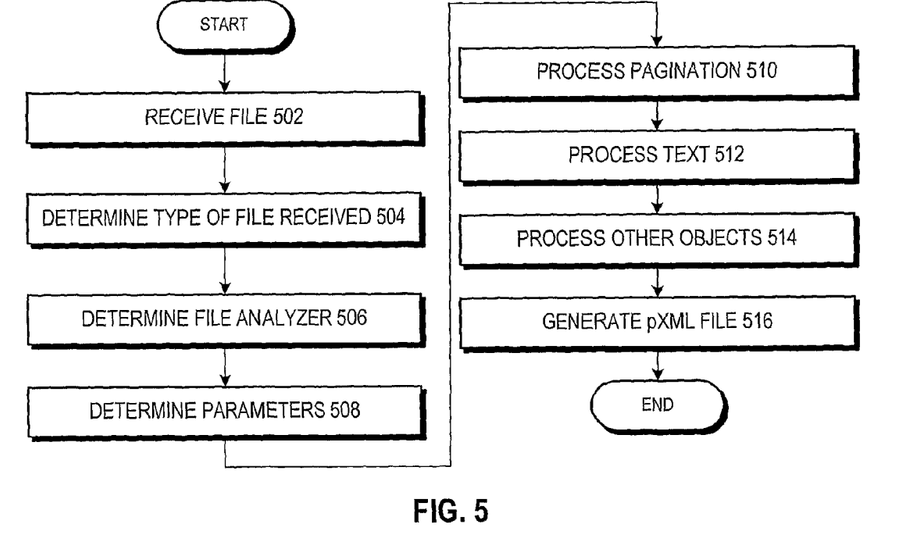
FIG. 5 presents an exemplary flow chart illustrating the operation of the universal content conversion hub in accordance with embodiments of the present invention.

FIG. 5 presents an exemplary flow chart illustrating the operation of the universal content conversion hub in accordance with embodiments of the present invention. During operation, the system receives a file (operation 502) and determines the type of the file received (operation 504). Subsequently, the system determines which file analyzer to use based on the file type (operation 506). The system also determines the corresponding parameters for the file analyzer (operation 508).

Subsequently, the file analyzer processes the pagination (operation 510) and the text for the file (operation 512). The system also processes other objects embedded in the file (operation 514) and generates a pXML file (operation 516).

Figure 6:
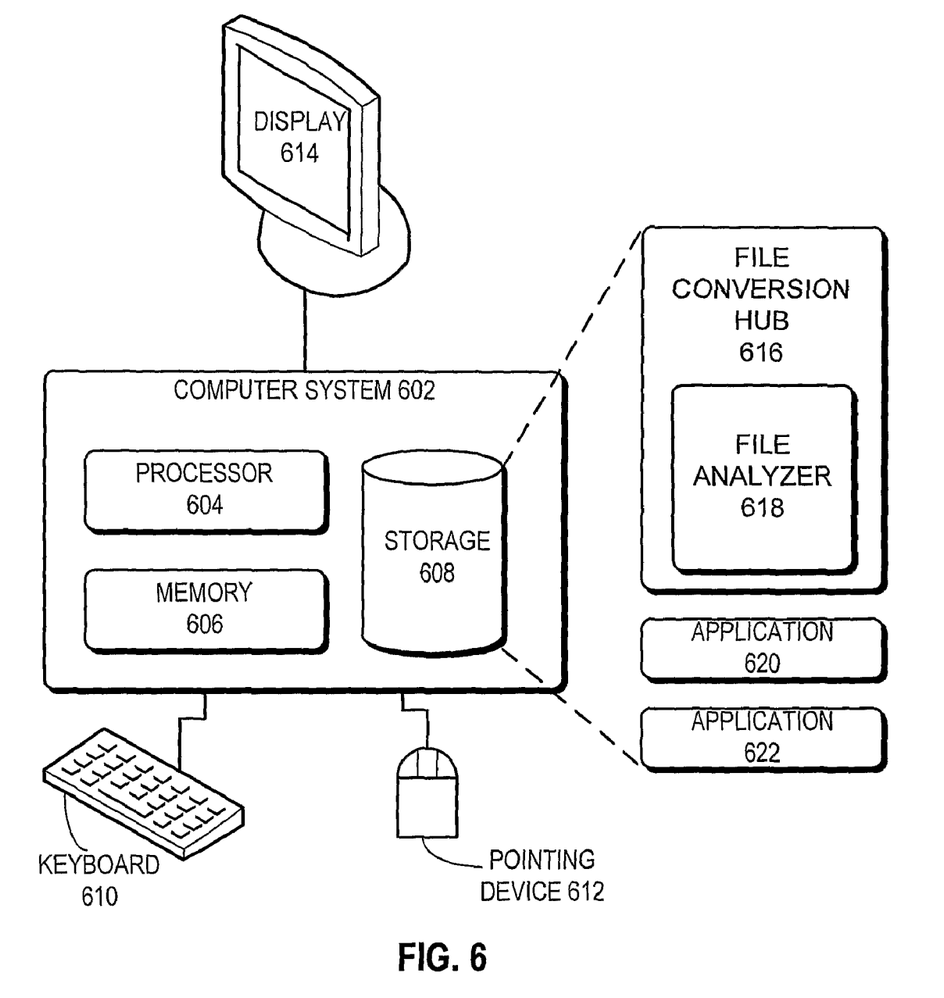
FIG. 6 illustrates an exemplary computer system operating as a universal content conversion hub in accordance with one embodiment of the present invention.

FIG. 6 illustrates an exemplary computer system operating as a universal content conversion hub in accordance with one embodiment of the present invention. A computer system 602 includes a processor 604, a memory 606, and a storage device 608. Also coupled to computer system 602 are a display device 614, a keyboard 610, and a pointing device 612. In one embodiment, storage device 618 stores programs that perform operations of a file conversion hub 616. Storage device 618 also contains programs that perform operations of file analyzer modules 618. Note that during operation, programs for file conversion hub 616 and file analyzer 618 are loaded into memory 606. Processor 604 reads the corresponding instructions from memory 606 and executes these instructions to perform the operations of file conversion hub 616.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating a universal file conversion hub to convert structured or unstructured data to structured data suitable for display on mobile or hand-held devices, the method comprising:

receiving a file which contains structured or unstructured data, or a mixture of both;

determining a type of the received file;

analyzing content, formatting style, or both, of the received file based on the file type;

generating a processable extensible markup language file, wherein the processable extensible markup language file retains a layout of the received file, thereby facilitating display of the file on mobile or hand-held devices; and defining the following elements in the processable extensible markup language:

XMLSTREAM, HEAD, DMETATAGS, DMETA, EMETATAGS, EMETA, DSTYLES, DSTYLE, DSTRUCTURE, BODY, SECTION, PAGE, PARAGRAPH, SPECIALTEXT, TEXT, IMAGE, LINK, FOOTNOTE, ENDNOTE, HEADER, FOOTER, ANCHOR, TAB, HR, MARKER, TABLE, TGROUP, TBODY, THEAD, TFOOT, ROW, CELL, COLUMN, COLUMN-DEF, LIST, LI, LABEL, BLOCKQUOTE, PRE, BREAK, FRAME, SVG, FIELD, and INDEX-ITEM;

wherein each element has one or more of the following attributes: style, css-style, number, font, font-size, font-fixed, origfont, emphasis, emphasis-bold, emphasis-italic, emphasis-underline, emphasis-superscript, emphasis-subscript, x, y, height, width, top, left, align, valign, leftindent, rightindent, spacebefore, spaceafter, textindent, border-left, border-right, border-top, border-bottom, top-padding, left-padding, right-padding, bottom-padding, rowspan, colspan, width-type, and height-type.

2. The method of claim 1, wherein the received file comprises one or more of the following files:
   a text file;
   a hyper-text file;
   a portable rendered document file;
   a formatted text file;
   a spreadsheet file;
   a presentation file;
   a publisher file;
   a LaTex file; and
   a program source code file.

3. The method of claim 1,
   wherein the received file contains structured data; and
   wherein generating the processable extensible markup language file involves applying an extensible stylesheet language transformation tool.

4. The method of claim 3, wherein applying the extensible stylesheet language transformation tool involves transforming the processable extensible markup language file to one or more of the following files:
   a DocBook XML file;
   a LegalXML file;
   a VoiceXML file;
   a MathXML file;
   a WML file; and
   an XHTML-MP file.

5. The method of claim 1, wherein analyzing content of the received file comprises:
   selectively converting images within the received file to a pre-determined format and marking a converted image with an IMAGE element;
   marking a bookmark, break character, field, header, footer, and footnote in the received file with an ANCHOR, BREAK, FIELD, HEADER, FOOTER, SECTION, and FOOTNOTE element, respectively, wherein the break character can be of a page, column, or section type;
   analyzing a text formatting style of the received file and assigning corresponding values to the attributes of a PARAGRAPH element;
   analyzing a special object embedded in the received file and marking the special object with a SPECIALTEXT element;
   marking a link within the received file with a LINK element;
   marking a list within the received file with a LIST element;
   marking a table within the received file with TABLE, TGROUP, TBODY, THEAD and COLUMN elements; and
   marking a layered structure within the received file with one or more FRAME elements.

6. The method of claim 1, wherein the received file includes a piece of program source code.

7. The method of claim 1, further comprising dynamically loading a file analyzer based on the file type.

8. A computer-readable non-transitory storage medium storing instructions that when executed by a computer cause the computer to perform a method for facilitating a universal file conversion hub to convert structured or unstructured data to structured data suitable for display on mobile or hand-held devices, the method comprising:
   receiving a file which contains structured or unstructured data, or a mixture of both;
   determining a type of the received file;
   analyzing content, formatting style, or both, of the received file based on the file type;
   generating a processable extensible markup language file, wherein the processable extensible markup language file retains a layout of the received file, thereby facilitating display of the file on mobile or hand-held devices; and
   defining the following elements in the processable extensible markup language:
   XMLSTREAM, HEAD, DMETATAGS, DMETA, EMETATAGS, EMETA, DSTYLES, DSTYLE, DSTRUCTURE, BODY, SECTION, PAGE, PARAGRAPH, SPECIALTEXT, TEXT, IMAGE, LINK, FOOTNOTE, ENDNOTE, HEADER, FOOTER, ANCHOR, TAB, HR, MARKER, TABLE, TGROUP, TBODY, THEAD, TFOOT, ROW, CELL, COLUMN, COLUMN-DEF, LIST, LI, LABEL, BLOCKQUOTE, PRE, BREAK, FRAME, SVG, FIELD, and INDEX-ITEM;
   wherein each element has one or more of the following attributes: style, css-style, number, font, font-size, font-fixed, origfont, emphasis, emphasis-bold, emphasis-italic, emphasis-underline, emphasis-superscript, emphasis-subscript, x, y, height, width, top, left, align, valign, leftindent, rightindent, spacebefore, spaceafter, textindent, border-left, border-right, border-top, border-bottom, top-padding, left-padding, right-padding, bottom-padding, rowspan, colspan, width-type, and height-type.

9. The computer-readable storage medium of claim 8,
   wherein the received file comprises one or more of the following files:
   a text file;
   a hyper-text file;
   a portable rendered document file;
   a formatted text file;
   a spreadsheet file;
   a presentation file;
   a publisher file;
   a LaTex file; and
   a program source code file.

10. The computer-readable storage medium of claim 8,
    wherein the received file contains structured data; and
    wherein generating the processable extensible markup language file involves applying an extensible stylesheet language transformation tool.

11. The computer-readable storage medium of claim 10, wherein applying the extensible stylesheet language transformation tool involves transforming the processable extensible markup language file to one or more of the following files:
    a DocBook XML file;
    a LegalXML file;
    a VoiceXML file;
    a MathXML file;
    a WML file; and
    an XHTML-MP file.

12. The computer-readable storage medium of claim 8, wherein analyzing content of the received file comprises:
    selectively converting images within the received file to a pre-determined format and marking a converted image with an IMAGE element;
    marking a bookmark, break character, field, header, footer, and footnote in the received file with an ANCHOR, BREAK, FIELD, HEADER, FOOTER, SECTION, and FOOTNOTE element, respectively, wherein the break character can be of a page, column, or section type;

analyzing a text formatting style of the received file and assigning corresponding values to the attributes of a PARAGRAPH element;

analyzing a special object embedded in the received file and marking the special object with a SPECIALTEXT element;

marking a link within the received file with a LINK element;

marking a list within the received file with a LIST element;

marking a table within the received file with TABLE, TGROUP, TBODY, THEAD and COLUMN elements; and marking a layered structure within the received file with one or more FRAME elements.

13. The computer-readable storage medium of claim 8, wherein the received file includes a piece of program source code.

14. The computer-readable storage medium of claim 8, wherein the method further comprises dynamically loading a file analyzer based on the file type.

15. A computer system for facilitating a universal file conversion hub to convert structured or unstructured data to structured data suitable for display on mobile or hand-held devices, the computer system comprising:
a processor;
a memory;
a receiving mechanism configured to receive a file which contains structured or unstructured data, or a mixture of both;
a file-type detection mechanism configured to determine a type of the received file;
a file analyzer configured to analyze content, formatting style, or both, of the received file based on the file type;
a file generation mechanism configured to generate a processable extensible markup language file, wherein the processable extensible markup language file retains a layout of the received file, thereby facilitating display of the file on mobile or hand-held devices; and
an element defining mechanism configured to define the following elements in the processable extensible markup language:
XMLSTREAM, HEAD, DMETATAGS, DMETA, EMETATAGS, EMETA, DSTYLES, DSTYLE, DSTRUCTURE, BODY, SECTION, PAGE, PARAGRAPH, SPECIALTEXT, TEXT, IMAGE, LINK, FOOTNOTE, ENDNOTE, HEADER, FOOTER, ANCHOR, TAB, HR, MARKER, TABLE, TGROUP, TBODY, THEAD, TFOOT, ROW, CELL, COLUMN, COLUMN-DEF, LIST, LI, LABEL, BLOCKQUOTE, PRE, BREAK, FRAME, SVG, FIELD, and INDEX-ITEM;
wherein each element has one or more of the following attributes: style, css-style, number, font, font-size, font-fixed, origfont, emphasis, emphasis-bold, emphasis-italic, emphasis-underline, emphasis-superscript, emphasis-subscript, x, y, height, width, top, left, align, valign, leftindent, rightindent, spacebefore, spaceafter, textindent, border-left, border-right, border-top, border-bottom, top-padding, left-padding, right-padding, bottom-padding, rowspan, colspan, width-type, and height-type.

16. The computer system of claim 15,
wherein the received file comprises one or more of the following files:
a text file;
a hyper-text file; a
portable rendered document file;
a formatted text file;
a spreadsheet file;
a presentation file;
a publisher file;
a LaTex file; and
a program source code file.

17. The computer system of claim 15,
wherein the received file contains structured data; and
wherein while generating the processable extensible markup language file, the file generation mechanism is configured to apply an extensible stylesheet language transformation tool.

18. The computer system of claim 17, wherein while applying the extensible stylesheet language transformation tool, the file generation mechanism is further configured to transform the processable extensible markup language file to one or more of the following files:
a DocBook XML file;
a LegalXML file;
a VoiceXML file;
a MathXML file;
a WML file; and
an XHTML-MP file.

19. The computer system of claim 15, wherein while analyzing content of the received file, the file analyzer is configured to:
selectively convert images within the received file to a pre-determined format and marking a converted image with an IMAGE element;
mark a bookmark, break character, field, header, footer, and footnote in the received file with an ANCHOR, BREAK, FIELD, HEADER, FOOTER, SECTION, and FOOTNOTE element, respectively, wherein the break character can be of a page, column, or section type;
analyze a text formatting style of the received file and assigning corresponding values to the attributes of a PARAGRAPH element;
analyze a special object embedded in the received file and marking the special object with a SPECIALTEXT element;
mark a link within the received file with a LINK element;
mark a list within the received file with a LIST element;
mark a table within the received file with TABLE, TGROUP, TBODY, THEAD and COLUMN elements; and
mark a layered structure within the received file with one or more FRAME elements.

20. The computer system of claim 15, wherein the received file includes a piece of program source code.

21. The computer system of claim 15, further comprising a file analyzer selecting mechanism configured to dynamically load a file analyzer based on the file type.

* * * * *